(12) United States Patent
Kang et al.

(10) Patent No.: US 10,000,036 B2
(45) Date of Patent: Jun. 19, 2018

(54) HIGH KINETIC ENERGY PENETRATOR SHIELDING AND HIGH WEAR RESISTANCE MATERIALS FABRICATED WITH BORON NITRIDE NANOTUBES (BNNTS) AND BNNT POLYMER COMPOSITES

(71) Applicant: The United States of America represented by the Administrator of the National Aeronautics and Space Administration, Washington, DC (US)

(72) Inventors: Jin Ho Kang, Newport News, VA (US); Cheol Park, Yorktown, VA (US); Godfrey Sauti, Hampton, VA (US); Michael W. Smith, Newport News, VA (US); Kevin C. Jordan, Newport News, VA (US); Sharon E. Lowther, Hampton, VA (US); Robert G. Bryant, Williamsburg, VA (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 85 days.

(21) Appl. No.: 14/753,848

(22) Filed: Jun. 29, 2015

(65) Prior Publication Data
US 2017/0190143 A1 Jul. 6, 2017

Related U.S. Application Data

(62) Division of application No. 13/136,216, filed on Jul. 26, 2011, now Pat. No. 9,067,385.
(Continued)

(51) Int. Cl.
B32B 5/26 (2006.01)
F41H 5/04 (2006.01)
(Continued)

(52) U.S. Cl.
CPC ............... *B32B 5/26* (2013.01); *C08J 5/005* (2013.01); *C08J 5/046* (2013.01); *D01D 5/38* (2013.01);
(Continued)

(58) Field of Classification Search
CPC ....................................................... B32B 5/26
See application file for complete search history.

(56) References Cited

U.S. PATENT DOCUMENTS

| | | | |
|---|---|---|---|
| 2005/0211930 A1* | 9/2005 | DeMeo | G01V 5/0008 250/516.1 |
| 2008/0209818 A1 | 9/2008 | Belnap et al. | |
| 2009/0221734 A1 | 9/2009 | Kuwahara et al. | |

FOREIGN PATENT DOCUMENTS

| | | |
|---|---|---|
| JP | 2007-1446039 | 6/2007 |
| JP | 2008-143743 | 6/2008 |

(Continued)

*Primary Examiner* — Daniel H Lee
(74) *Attorney, Agent, or Firm* — Jennifer L. Riley; Robin W. Edwards; Mark P. Dvorscak

(57) ABSTRACT

Boron nitride nanotubes (BNNTs), boron nitride nanoparticles (BNNPs), carbon nontubes (CNTs), graphites, or their combinations, are incorporated into matrices of polymer, ceramic or metals. Fibers, yarns, and woven or nonwoven mates of BNNTs are uses as toughening layers in penetration resistant materials to maximize energy absorption and/or high hardness layers to rebound or deform penetrators. They can be also uses as reinforcing inclusions combining with other polymer matrices to create composite layer like typical reinforcing fibers such as Kevlar®, Spectra®, ceramics and metals. Enhanced wear resistance and prolonged usage time, even under harsh conditions, are achieved by adding boron nitride nanomaterials because both hardness and toughness are increased. Such materials can be used in high temperature environments since the oxidation temperature of BNNTs exceeds 800° C. in air. Boron nitride based com- (Continued)

posite materials are useful as strong structural materials for anti-micrometeorite layers for spacecraft and space suits, ultra strong tethers, protective gear for the human body as well as for vehicles, helmets, shields and safety suits/helmets for industry.

20 Claims, 6 Drawing Sheets

Related U.S. Application Data

(60) Provisional application No. 61/400,320, filed on Jul. 26, 2010.

(51) Int. Cl.
*D01D 5/38* (2006.01)
*C08J 5/00* (2006.01)
*C08J 5/04* (2006.01)
*D01F 1/10* (2006.01)
*B82Y 30/00* (2011.01)

(52) U.S. Cl.
CPC ............. *D01F 1/10* (2013.01); *F41H 5/0414* (2013.01); *F41H 5/0442* (2013.01); *F41H 5/0471* (2013.01); *F41H 5/0485* (2013.01); *B32B 2260/046* (2013.01); *B32B 2262/0269* (2013.01); *B32B 2264/107* (2013.01); *B32B 2307/554* (2013.01); *B32B 2307/558* (2013.01); *B32B 2571/02* (2013.01); *B82Y 30/00* (2013.01); *C08J 2375/04* (2013.01)

(56) References Cited

FOREIGN PATENT DOCUMENTS

| | | | | |
|---|---|---|---|---|
| JP | 2008-222964 | | 9/2008 | |
| JP | 2009-161657 | | 7/2009 | |
| WO | WO 2004072321 A1 * | 8/2004 | ........... F41H 5/0485 |

* cited by examiner

Fig. 1A
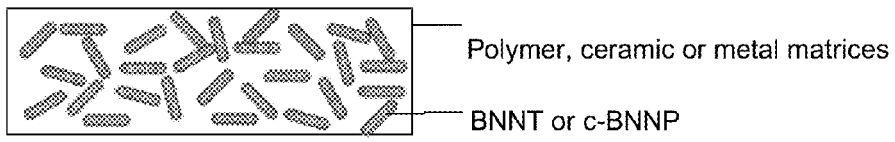
Polymer, ceramic or metal matrices
BNNT or c-BNNP

Fig. 1B
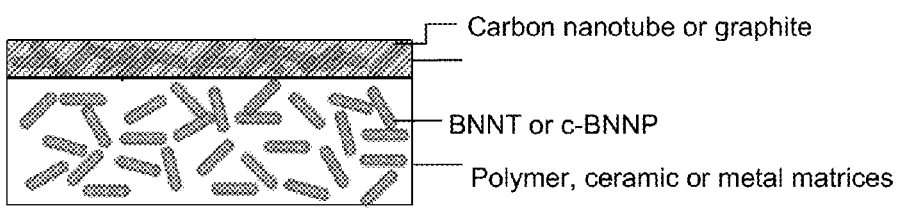
Carbon nanotube or graphite
BNNT or c-BNNP
Polymer, ceramic or metal matrices Fig. 1C
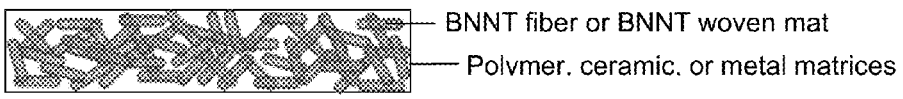
BNNT fiber or BNNT woven mat
Polymer, ceramic, or metal matrices Fig. 1D
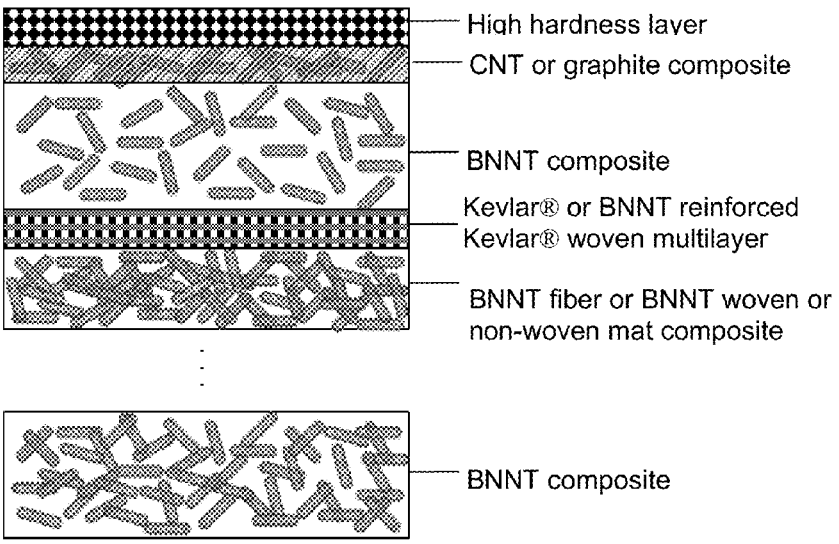
High hardness layer
CNT or graphite composite
BNNT composite
Kevlar® or BNNT reinforced Kevlar® woven multilayer
BNNT fiber or BNNT woven or non-woven mat composite
BNNT composite

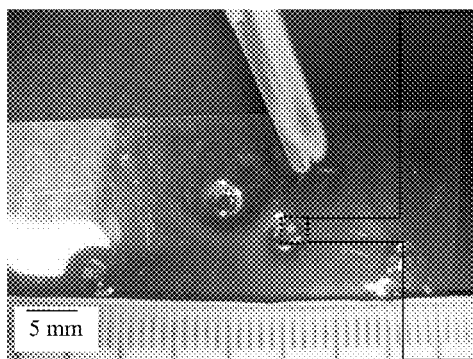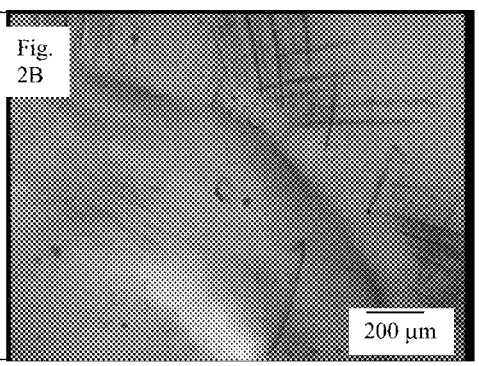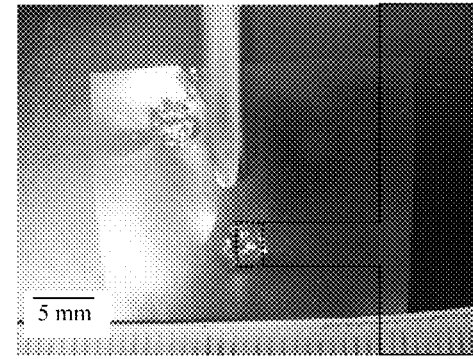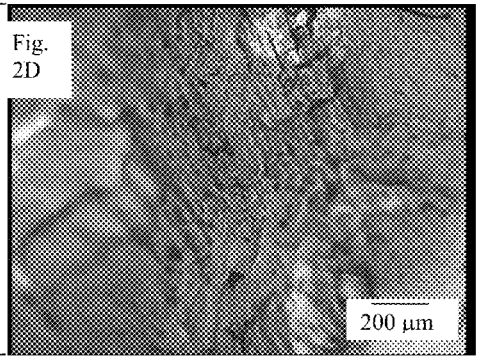

HIGH KINETIC ENERGY PENETRATOR SHIELDING AND HIGH WEAR RESISTANCE MATERIALS FABRICATED WITH BORON NITRIDE NANOTUBES (BNNTS) AND BNNT POLYMER COMPOSITES

CROSS-REFERENCE TO RELATED PATENT APPLICATION(S)

This patent application is a divisional of U.S. Non-Provisional patent application Ser. No. 13/136,216, filed on Jul. 26, 2011, which claims the benefit of priority to U.S. Provisional Application Ser. No. 61/400,320, filed on Jul. 26, 2010, for "High Kinetic Energy. Penetrator Shielding and High Wear Resistance Materials Fabricated With Boron Nitride Nanotubes (BNNTs) and BNNT Polymer Composites." The contents of the foregoing applications are hereby incorporated by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

The present invention relates to impact and wear resistant material, and, more particularly to impact and wear resistant material fabricated with boron nitride nanotubes (BNNTs).

2. Description of Related Art

Micrometeoroids develop very high kinetic energies as they travel through space and pose a significant hazard to spacecraft and astronauts. The velocities of the micrometeorites can reach 20 kilometers per second prior to impact on the lunar surface [Eagle Engineering Incorporated, "Lunar Base Environment Report", Kennedy Space Center, July, 1989]. Therefore an improved protective system utilizing new materials is needed to effectively shield space vehicles and structures against high kinetic energy penetrators as well as to provide penetration resistant space suits. In addition, new lightweight, conformable body armor for protection against high kinetic energy penetrators such as bullets and shrapnel, whilst providing increased mobility, has been sought for accomplishing successful missions on the modern battlefield.

Some materials have been considered for protection against high-speed penetrating impacts. Both non-metallic and metallic materials are often used for the protection. The non-metallic protective materials include Aramid (Kevlar®), ultra high molecular weight polyethylene (Spectra®), Mylar®, Fiberglass, Nylon, Nomex®, or ceramic composite plates [W. J. Perciballi, U.S. Pat. No. 6,408,733]. Carbon nanotubes and their composites have been suggested as well [K. Mylvaganam and L. C. Zhang, "Ballistic resistance capacity of carbon nanotubes," Nanotechnology, 47, 475701 (2007)]. The metallic protective materials include titanium and steel. Some of these materials have been proven to be highly protective against the high kinetic energy penetrators [F. J. Stimler, "System Definition Study of Deployable Non-metallic Space Structures", Goodyear Aerospace Corporation, Report No. GAC 19-1615; NASA Contract NAS8-35498, June 1984].

Materials manufactured from heavy inorganic materials (metals and ceramics) have been used to achieve materials for use in environments where wear-resistant qualities are required.

State-of-the-art polymeric protective materials such as Kevlar® and Spectra® show poor thermal stability. The metallic or ceramic protective materials are very heavy, resulting in increased launch costs for space applications. Due to weight restrictions, these materials cannot be used in new space vehicle/structure concepts such as inflatable habitats and solar sails. Body armor fabricated with these materials provides little comfort and greatly restricts the wearer's mobility; as a result its use is often limited primarily to body torso protection.

Although carbon nanotubes are useful in high temperature environments up to 400° C., they oxidize and burn at temperatures above 400° C. so alternate materials are sought for use in environments experiencing temperatures above 400° C. As shown in FIG. 5, BNNT materials have significant advantages in such high-temperature environments.

In certain applications, heavy, inorganic metals are used to achieve high wear resistance. Such metals increase the weight and reduce the efficiency of the apparatus.

In recent years, anti-penetration materials have been more and more widely used for protective apparel, bullet-proof vests, and micrometeoroid and orbital debris protection layers for space suits as well as space vehicles and structures.

In order to maximize the protection ability of a material against high kinetic energy penetrators, the following two major material properties should be considered: (1) high hardness for rebounding and/or gross mechanical deformation of the penetrator; and (2) high toughness for effective energy absorption during the mechanical deformation (and heat) of the protecting materials.

It is a primary aim of the present invention to provide a lightweight high kinetic energy penetration protection material fabricated with boron nitride nanotubes (BNNTs) and BNNT composites to maximize the energy absorption in the course of mechanical deformation, and heat, of the protecting materials under an impact.

It is an object of the invention to provide a lightweight high kinetic energy penetrator protection material fabricated with high hardness particles, such as boron nitride based nanoparticles (BNP) and BNP composites, to maximize rebounding of the penetrator or for gross mechanical deformation of the penetrator.

It is an object of the invention to provide materials having high wear resistance, and thus prolonged usage time of such materials under harsh abrasive conditions, such as battlefields and space environments, by improving hardness and toughness through the use of boron nitride nanomaterials.

It is an object of the invention to provide a lightweight high kinetic energy penetrator protection material fabricated with carbon nanotubes (CNTs), graphites, graphene oxides and their composites to maximize the energy absorption via mechanical deformation (and heat) of the protective materials.

It is an object of the invention to provide lightweight, high wear resistance materials fabricated with boron nitride nanotubes (BNNTs), boron nitride based nanoparticles (BNPs), boron-carbon-nitride nanotube ($B_xC_yN_z$ nanotubes), carbon nanotubes (CNTs), graphites, and their composites to prolong the usage time at a severe abrasion condition.

It is an object of the invention to provide a lightweight, ultra hard and tough BNNT fiber/woven/non-woven composite mat for flexible armor.

It is an object of the invention to provide a lightweight, high kinetic energy penetrator protection material fabricated with boron nitride nanotubes (BNNTs), boron nitride nanoparticles (BNPs), boron-carbon-nitride nanotubes ($B_xC_yN_z$ nanotubes), carbon nanotubes (CNTs), graphites, graphene oxides, metal coated nanoinclusions, metal particles and their composites to minimize a locally concentrated heating damage via increasing thermal conductivity.

It is a further object of the invention to provide a lightweight, ultra hard and tough BNNT fiber/woven/non-woven composite mat for space suit layers and deployable space craft systems.

Finally, it is an object of the present invention to accomplish the foregoing objectives in a simple and cost effective manner.

The above and further objects, details and advantages of the invention will become apparent from the following detailed description, when read in conjunction with the accompanying drawings.

BRIEF SUMMARY OF THE INVENTION

The present invention addresses these needs by providing a method for manufacturing an impact resistant material by synthesizing a boron containing nanomaterial/polymer material from a boron containing nanomaterial and a matrix by controlled dispersion of the boron containing nanomaterial into the matrix. The synthesized material is then applied to an object to be protected from impact. The boron containing nanomaterial is boron nitride nanotubes (BNNTs), boron nitride nanoparticles (BNPs), boron carbon-nitride nanotubes ($B_xC_yN_z$ nanotubes), carbon nanotubes (CNTs), graphites, graphene oxides, metal coated nanoinclusions, metal particles, or composites thereof. The matrix is preferably provided with additional hardness by adding cubic boron nitride nanoparticles (c-BNNP), boron carbides, silicon carbide, titanium alloys or zirconia. The shape of the boron containing nanomaterial is preferably nanotubes, nanosheets, nanoribbons, nanoparticles, nanorods, nanoplatelets, nanocages, nanosprings, or nanomultipods. The boron containing nanomaterial is preferably homogeneously dispersed into the matrix. The boron containing nanomaterial is preferably synthesized by in-situ polymerization under simultaneous shear and sonication. The matrix is preferably synthesized from a hydrogen containing polymer, a hydrogen containing monomer, or a combination thereof. Other alternatives for synthesis of the matrix are a boron containing polymer, a boron containing monomer, and a combination thereof; or a nitrogen containing polymer, a nitrogen containing monomer, and a combination thereof. The concentration of boron nitride in the matrix is preferably between 0% and 5% by weight and most preferably is 5% by weight. The boron containing nanomaterial may comprise boron, nitrogen, carbon and hydrogen. The synthesized material may be in the form of a fiber which may be incorporated into fabric. Further, the synthesized fiber may be incorporated into a mat. Additionally, a polymer, a ceramic, and a metal may be infused into the fibers. The matrix may be a polymer matrix or a ceramic matrix. A method for manufacturing a multi-layer impact resistant material includes synthesizing a first layer of boron containing nanomaterial/polymer material from a BNNT and a matrix by controlled dispersion of the boron containing nanomaterial into the matrix and synthesizing a second layer of boron containing nanomaterial/polymer material from a carbon nanotube (CNT) and a matrix by controlled dispersion of the boron containing nanomaterial into the matrix. A multi-layered composite film is formed from the synthesized first and second layers, infused with polyurethane (PU), polyimide, polyethylene, aromatic polyamide, epoxy, phenol formaldehyde, or polyester resins; and then the synthesized film is applied to an object to be protected from impact. Finally, the methods described herein provide, in addition to impact resistant materials, wear resistant materials.

BRIEF DESCRIPTION OF THE SEVERAL VIEWS OF THE DRAWINGS

A more complete description of the subject matter of the present invention and the advantages thereof, can be achieved by reference to the following detailed description by which reference is made to the accompanying drawings in which:

FIGS. 1A through 1D show a schematic diagram of high kinetic energy penetrator protection materials made according to the present invention: (FIG. 1A) BNNT or cubic-Boron Nitride Nano Particle (c-BNNP) composite; (FIG. 1B) BNNT or c-BNNP composite and CNT or graphite composite multilayer; (FIG. 1C) BNNT fiber or BNNT woven or non-woven mat composite; (FIG. 1D) high hardness and high toughness multilayer composite;

FIGS. 2A through 2D show impact damaged images: (FIG. 2A) photo taken by a digital camera of a control sample and (FIG. 2B) optical microscope image of a control sample; (FIG. 2C) photo taken by a digital camera of a BNNT reinforced sample according to the present invention and (FIG. 2D) optical microscope image of a BNNT reinforced sample according to the present invention;

(FIG. 3A) spacecraft, (FIG. 3B) space-habitat, (FIG. 3C) helmet, (FIG. 3D) body armor and (FIG. 3E) vehicle armor;

(FIG. 4A) brake pad, (FIG. 4B) gears, (FIG. 4C) knee joint replacement prostheses and (FIG. 4D) protection pads.

DETAILED DESCRIPTION OF THE PREFERRED EMBODIMENT

Figure 3A:
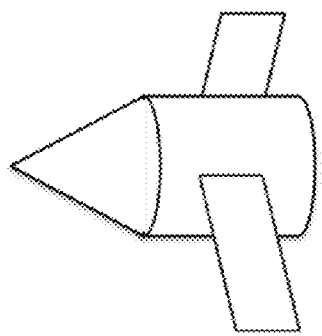
FIGS. 3A through 3E show applications for anti-high kinetic energy penetrator protecting composites according to the present invention.
Figure 3B:
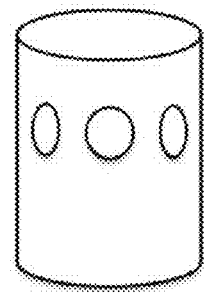
Figure 3C:
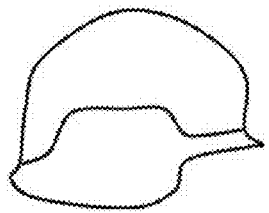
Figure 3D:
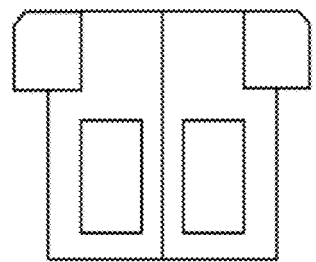
Figure 3E:
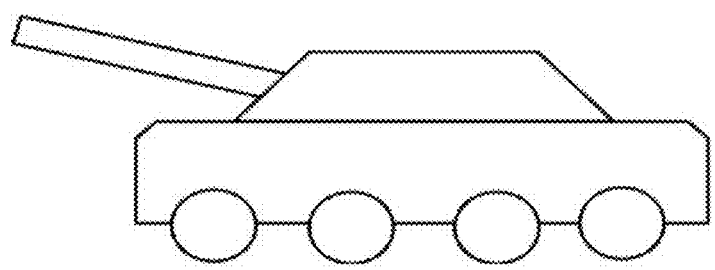
Figure 4A:
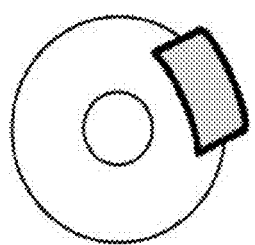
FIGS. 4A through 4D show the present invention as used in applications requiring high wear resistance materials.
Figure 4B:
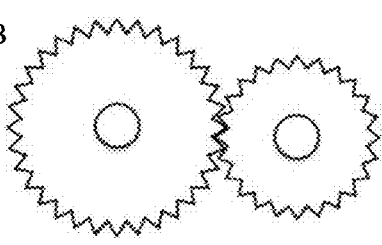
Figure 4C:
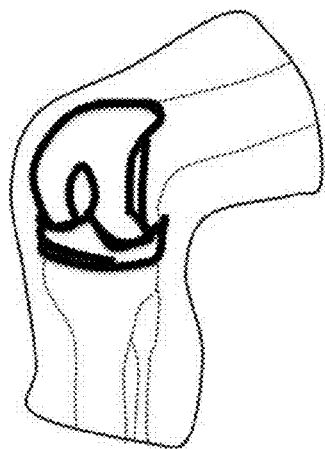
Figure 4D:
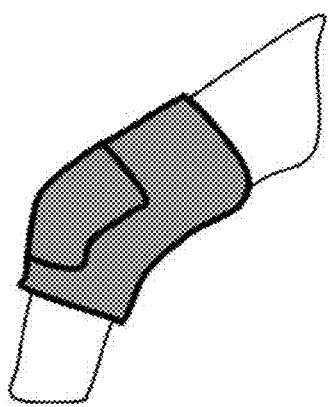
Figure 5:
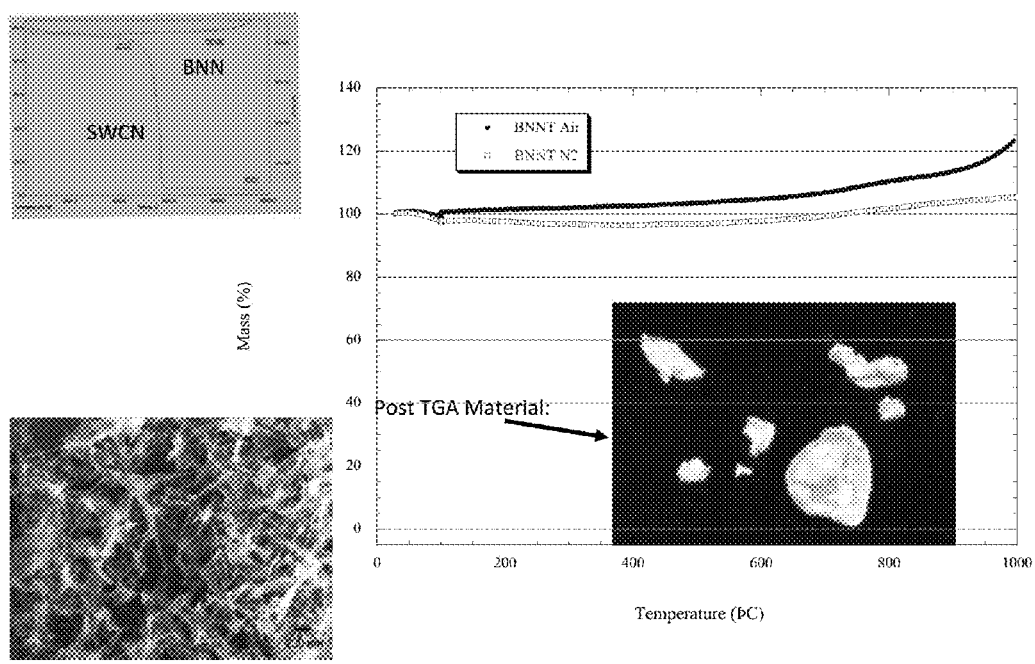
FIG. 5 shows a Thermogravimetric Analysis (TGA) of CNT and BNNT.

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Recently a novel material, boron nitride nanotube (BNNT), has been developed, which possesses high strength-to-weight ratio, high temperature resistance (above 800° C. in air), piezoelectricity, and radiation shielding capabilities [A. Rubio et al, *Phys. Rev. Lett.* 49, 5081 (1994); N. G Chopra et al, Science, 269, 966 (1995)]. The superior mechanical (hardness and toughness) and thermal (stability and conductivity) properties of these BNNTs make them an ideal material to develop a novel lightweight and high performance anti-penetrator material. They also provide excellent wear properties because of their unique high hardness, aspect ratio, and toughness, especially at elevated temperatures up to 900° C. Recently, a new and conceptually simple method of producing extraordinarily long, highly crystalline BNNTs was demonstrated. M. W. Smith et al., US Patent Application Pub 2009/0117021, M. W. Smith et al, *Nanotechnology*, 20, 505604 (2009), Continuation-In-Part application Ser. No. 12/322,591 filed Feb. 4, 2009 for "Apparatus for the Production of Boron Nitride Nanotubes" and Continuation-In-Part application Ser. No. 12/387,703 filed May 6, 2009 for "Boron Nitride Nanotube Fibrils and Yarns", all of which are incorporated herein by reference in their entireties, describe such materials. Co-pending U.S. patent application Ser. No. 13/068,329 filed May 9, 2011, entitled "Neutron and Ultraviolet Shielding Films Fabricated Using Boron Nitride Nanotubes and Boron Nitride Nanotube Polymer Composites", describing the manufacture of radiation shielding films fabricated using boron nitride nanotubes and boron nitride nanotube polymer composites, and Co-pending U.S. patent application Ser. No. 12/278,866 filed Oct. 13, 2010, entitled "Energy Conversion Materials Fabricated with Boron Nitride Nanotubes (BNNTs) and BNNT Polymer composites", describing actuators and sensors fabricated with boron nitride nanotubes (BNNTs) and BNNT polymer composites, are also incorporated herein by reference in their entireties. Effective toughening efficacy of using nanotubular inclusions has been reported (Nanotubular Toughening Inclusions, Park et al, U.S. patent application Ser. No. 13/032,045, filed 2011 (LAR 17088); C. Lovell, K. E. Wise, J.-W. Kim, P. T. Lillehei, J. S. Harrison, C. Park, "Thermodynamic Approach to Enhanced Dispersion and Physical Properties in a Carbon Nanotube/Polypeptide Nanocomposite" *Polymer*, 50, 1925 (2009) (see page 1931 left column))

First, a BNNT/polymer nanocomposite film was synthesized to evaluate its properties as an anti-penetrator material. A high temperature polyimide was synthesized from a diamine, 2,6-bis(3-aminophenoxy) benzonitrile ((ß-CN) APB), and a dianhydride, pyromelliticdianhydride (PMDA), and used as a matrix for this invention. The concentrations of BNNTs in the polyimide were 0 and 5 wt %. A schematic of the BNNT/polymer nanocomposite structure is shown in FIG. 1(*a*). The hardness of the BNNT/polymer nanocomposites was measured by a microindentation method and the thermal conductivity of the nanocomposites was measured with Netzsch 457 Laser Flash Apparatus (Table 1). The loading force, duration time and speed of the indentation were 500 gf (4.90 N), 10 seconds, and 10 μm/s, respectively. While the hardness of the pristine polyimide was 24.3±0.7 kgf/mm$^2$, (238±7 MPa), that of the 5% BNNT doped polyimide composite was 49.8±7.6 kgf/mm$^2$ (488±75 MPa), showing 104.9% increase. Cubic boron nitride nanoparticles (c-BNNP), the second hardest material (Knoop hardness of 45 GPa) following diamond (Knoop hardness of 100 GPa), with superior thermal and chemical stability, may be added into matrices to secure superior hardness. Other hard materials such as boron carbides, silicon carbide, titanium alloys and zirconia can also be used as fillers. The enhanced hardness of the composite material provides an effective protecting capability against high kinetic energy penetrators by rebounding and/or causing gross mechanical deformation of the penetrator. In addition, adding 5% BNNT into the polymer matrix increased thermal conductivity by about 140% (Table 1). The increased thermal conductivity helps to reduce locally concentrated heating damage from the impact of high kinetic energy penetrators. The increased thermal conductivity along with the high thermal stability (>800° C. in air) helps to reduce a locally concentrated heating damage from the impact of high kinetic energy penetrators. Lightweight high kinetic energy penetrator protection material fabricated with boron nitride nanotubes (BNNTs), boron nitride nanoparticles (BNPs), boron-carbon-nitride nanotube ($B_xC_yN_z$ nanotubes), carbon nanotubes (CNTs), graphites, graphene oxides, metal coated nanoinclusions, metal particles and their composites minimizes locally concentrated heating damage via increasing thermal conductivity.

TABLE 1

Microindentation hardness and thermal conductivity of pristine and BNNT reinforced polymer composite

| Sample | Hardness (kgf/mm$^2$) | Thermal Conductivity W/(m · K) |
|---|---|---|
| Pristine PI | 24.3 ± 0.7 | 0.132 ± 0.004 |
| BNNT reinforced PI | 49.8 ± 7.6 (104.9% increase) | 0.319 ± 0.029 (140% increase) |

A multi-layered composite film was fabricated using BNNT and carbon nanotube (CNT) layers infused with polyurethane (PU) resin as shown in FIG. 1(*b*). Table 2 shows the mechanical properties of the multi-layered composite film prepared. The elastic modulus of the pristine PU was only 60.9 MPa, but that of the multi-layered composite was 756.9 MPa, showing increase of 1143.8%. The increased modulus of the BNNT/CNT composite promises the increase of toughness before fracture, which is another critical property for the anti-penetrator protection in addition to the high hardness.

TABLE 2

Mechanical properties of pristine and BNNT reinforced polymer composite

| Sample | Young's Modulu | Maximum Tensile | Tensile Stress at | Tensile Strain at |
|---|---|---|---|---|
| Pristine PU | 60.9 | 17.7 | 17.7 | 338.7 |
| BNNT reinforced | 756.9 (1143.8% | 14.7 | 13.0 | 3.2 |

BNNT fibers or BNNT woven or non-woven mats can be used for the protection layer. Infusing a polymer, ceramic, or metal into the BNNT fibers or mats can increase the mechanical strength further (FIG. 1(*c*)). A multi-layered composite containing both high hardness and high toughness layers can greatly enhance the anti-penetration protection and increase the wear resistance. A schematic of a multi-layered composite is shown in FIG. 1(d). The top high hardness layer consisting of BNNT, c-BNNP or other high hardness materials provides initial protection against penetrators by bouncing or deforming them. The combination of various toughened layers such as a Kevlar® fabric (mat), BNNT reinforced Kevlar® woven or non-woven mat, BNNT or CNT composite layer offers superior toughness enabling effective absorption of the impact energy. High temperature resistance of the BNNT fibers/woven/non-woven mats (>800° C.) as well as their high thermal conductivity can further improve the anti-penetrator protection capability by dissipating thermal energy or heat very effectively without causing any loss of structural integrity. The high wear resistance can provide a durability of this protection material in harsh environments.

Figure 6:
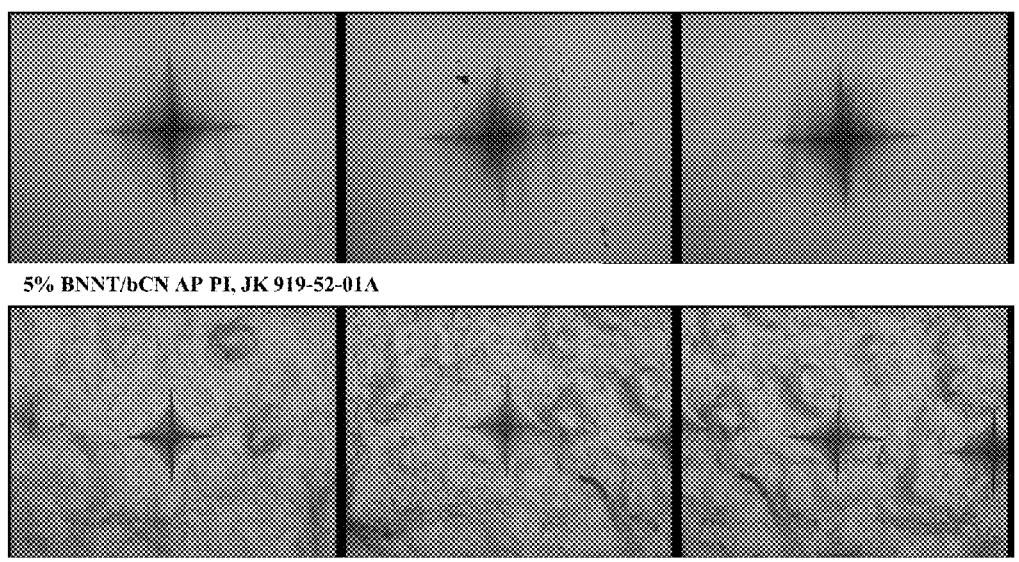
FIG. 6 shows the results of a Nanoindentation Vickers Hardness Test of BNNT composites.

FIG. 2 shows an experimental result of an impact test by a potential energy method. All the target materials were pristine polyimide films. To observe the impact damage alleviation with BNNT composite, two different cover films for the targets were prepared: A control target specimen (pristine polyimide) was covered with two additional pristine polyimide films (FIGS. 2(a) and (b)). To study the BNNT reinforcing effect, the other pristine polyimide target film was covered with a 2% BNNT/polyimide composite film and BNNT/CNT multi-layer film (FIGS. 2(c) and (d)). The impact energy was 1.5 J for the BNNT reinforced film, corresponding to 0.27% of the US National Institute of Justice ballistic and slab documents (NIJ Standard-01101.06) type II protection limit energy (9 mm Parabellum Full Metal jacketed Round Nose (FMJ RN) bullet (8 g) at a velocity of 373 m/s). After impact, the cover films were removed, and images of each pristine and target film were taken. As shown in FIG. 2, the control target created sharp and deep impact damage marks (FIG. 2(a)). On the other hand, the BNNT reinforced target generated wrinkled and shallow impact damage marks (FIG. 2(c)). Optical microscopy images (FIGS. 2(b) and (d)) showed a clear difference between the impact damages of the control target and the BNNT reinforced target. As also shown in FIG. 6, the BNNT reinforced target showed more wrinkled damage surface indicating that more energy was absorbed at the moment of impact.

FIG. 3 shows possible applications of the present invention. BNNT reinforced composite can be used for anti-high kinetic energy penetrator layer for spacecraft and space-habitats (FIGS. 3(a) and (b)). Other possible uses include military and police applications such as helmets/shields, body armors and vehicle armors (FIG. 3(c)-(e)).

In addition, the enhanced hardness and toughness using boron nitride nanomaterials promise high wear resistance. Thus, the enhanced wear resistance helps to prolong the usage time of anti-penetration material under harsh abrasive conditions, such as battlefields.

This material is an improvement for environments requiring a material having high wear-resistance characteristics for mechanical use such as brake pads, gears, vehicle tires, microelectromechanical system (MEMS) components, medical use such as dental restorative materials, prostheses and/or replacement joints, and entertainment/sports uses such as protection pads (FIG. 4(a)-(d)). The BN and BNNT materials also offer transparent armor/shields and transparent wear resistance coatings and materials.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. A method for manufacturing an impact resistant material, comprising:
   synthesizing a boron containing nanomaterial/polymer material by:
      forming a first layer from a boron containing nanomaterial and a first matrix by controlled dispersion of the boron containing nanomaterial into the first matrix utilizing in-situ polymerization under shear and sonication;
      forming a second layer from a carbon nanotube (CNT) containing material and a second matrix by controlled dispersion of the CNT containing material into the second matrix; and
      infusing the first layer and the second layer with a resin; and
   applying the synthesized material to an object to be protected from impact such that the first layer is disposed between the second layer and the object.

2. The method of claim 1, wherein the boron containing nanomaterial is selected from the group consisting of boron nitride nanotubes (BNNTs), boron nitride nanoparticles (BNPs), boron-carbon-nitride nanotubes ($B_xC_yN_z$ nanotubes), carbon nanotubes (CNTs), graphites, grapheme oxides, metal coated nanoinclusions, metal particles, and the composites thereof.

3. The method of claim 1, wherein the first matrix is provided with additional hardness by adding a material selected from the group consisting of cubic boron nitride nanoparticles (c-BNNP), boron carbides, silicon carbide, titanium alloys and zirconia.

4. The method of claim 1, wherein the shape of the boron containing nanomaterial is selected from the group consisting of nanotubes, nanosheets, nanoribbons, nanoparticles, nonfoods, nanoplatelets, nanocages, nanosprings, and nanomultipods.

5. The method of claim 1, wherein the boron containing nanomaterial is homogeneously dispersed into the first matrix.

6. The method of claim 1, wherein the boron containing nanomaterial is synthesized by in-situ polymerization under simultaneous shear and sonication.

7. The method of claim 1, wherein the first matrix is synthesized from a substance selected from the group consisting of a hydrogen containing polymer, a hydrogen containing monomer, and a combination of thereof.

8. The method of claim 1, wherein the first matrix is synthesized from a substance selected from the group consisting of a boron containing polymer, a boron containing monomer, and a combination thereof.

9. The method of claim 1, wherein the first matrix is synthesized from a substance selected from the group consisting of a nitrogen containing polymer, a nitrogen containing monomer, and a combination thereof.

10. The method of claim 1, wherein a concentration of boron nitride in the first matrix is between 0% and 5% by weight.

11. The method of claim 1, wherein a concentration of boron nitride in the first matrix is 5% by weight.

12. The method of claim 1, wherein the matrix is a polymer matrix.

13. The method of claim 1, wherein the matrix is a ceramic matrix.

14. The method of claim 1, wherein the first matrix and the second matrix comprise different materials.

15. A method for manufacturing an impact resistant material, comprising:
   synthesizing a boron containing nanomaterial/polymer fiber by:
      forming a composition from a boron containing nanomaterial and a matrix by controlled dispersion of the boron containing nanomaterial into the matrix; and
      forming the composition into a fiber; and
   applying the synthesized fiber to an object to be protected from impact.

16. The method of claim 15, further comprising incorporating the fiber into fabric, wherein applying the synthesized fiber to the object comprises applying the fabric to the object.

17. The method of claim 15, further comprising incorporating the fiber into a mat, wherein applying the synthesized fiber to the object comprises applying the mat to the object.

18. The method of claim 15, further comprising infusing a material selected from the group consisting of a polymer, a ceramic, and a metal into the fiber.

19. A method for manufacturing a wear resistant material, comprising:
   synthesizing a boron containing nanomaterial/polymer material by:
      forming a first layer from a boron containing nanomaterial and a matrix material by controlled dispersion of the boron containing nanomaterial into the matrix material utilizing in-situ polymerization under shear and sonication;
      forming a second layer from a nanomaterial and the matrix material by controlled dispersion of the nanomaterial into the matrix material; and
      infusing the first layer and the second layer with a resin; and
   applying the synthesized material to an object for improved wear resistance such that the first layer is disposed between the second layer and the object.

20. The method of claim 19, wherein the shear and sonication are simultaneous.

* * * * *